Aug. 31, 1937.   N. V. MARDOVIN   2,091,326
AUTOMATIC PARKING MECHANISM FOR VEHICLES
Filed Feb. 28, 1935   2 Sheets-Sheet 1
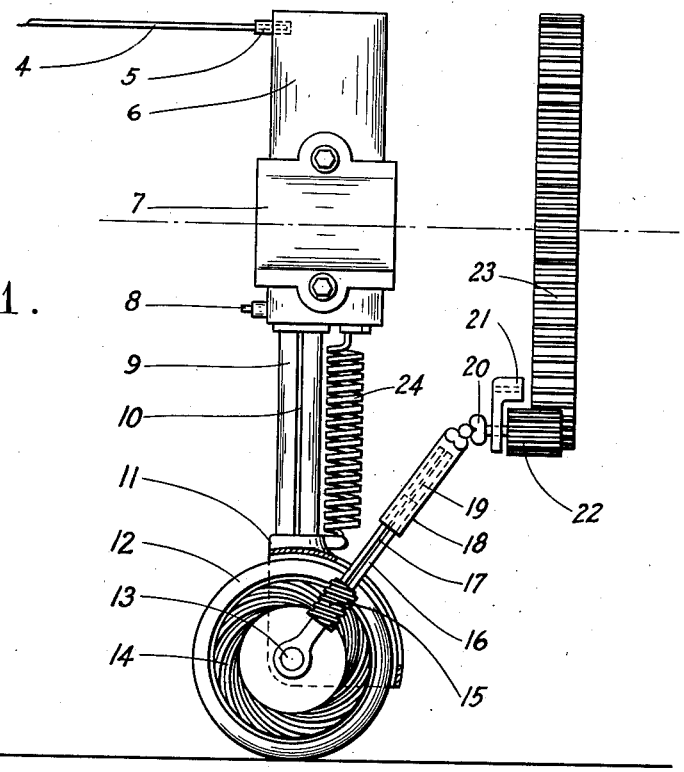
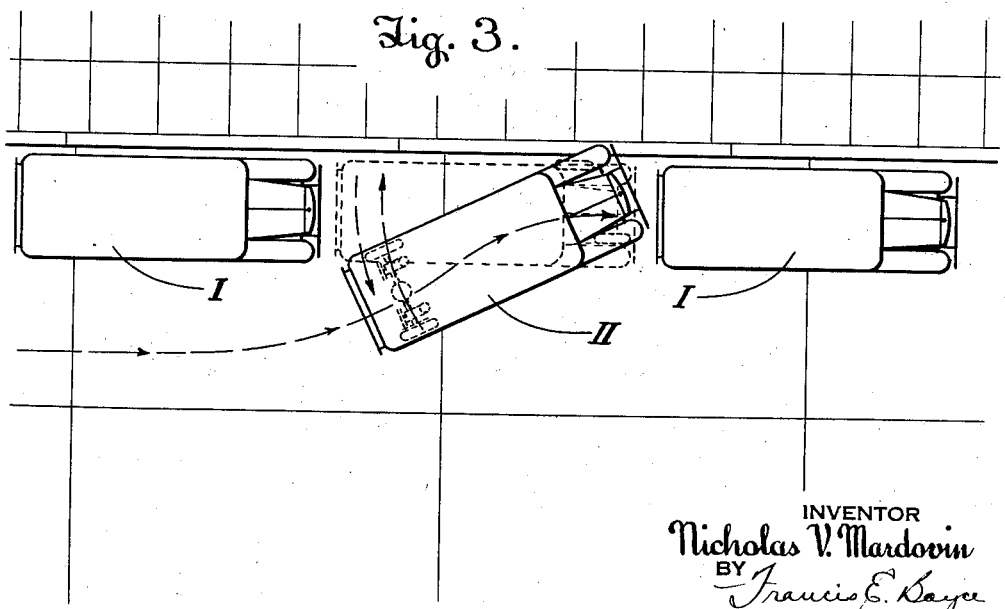
INVENTOR
Nicholas V. Mardovin
BY Francis E. Boyce
ATTORNEY Patented Aug. 31, 1937

2,091,326

UNITED STATES PATENT OFFICE 2,091,326

AUTOMATIC PARKING MECHANISM FOR VEHICLES

Nicholas Vernon Mardovin, Mexico, D. F., Mexico

Application February 28, 1935, Serial No. 8,710
In Mexico January 9, 1935

2 Claims. (Cl. 180—1)

This invention relates to apparatus for use in connection with vehicles, and particularly motor vehicles, the principal object of the invention being to provide means for facilitating the act of parking and by means of which such vehicles may be parked without difficulty in a minimum of space.

In the accompanying drawings,

Fig. 1 is a front elevation of a portion of the apparatus illustrating the manner in which the same is applied to the front wheels of a motor vehicle;

Fig. 3 is a diagrammatic plan view illustrating the manner in which vehicles equipped with the apparatus may be parked.

Figure 2:
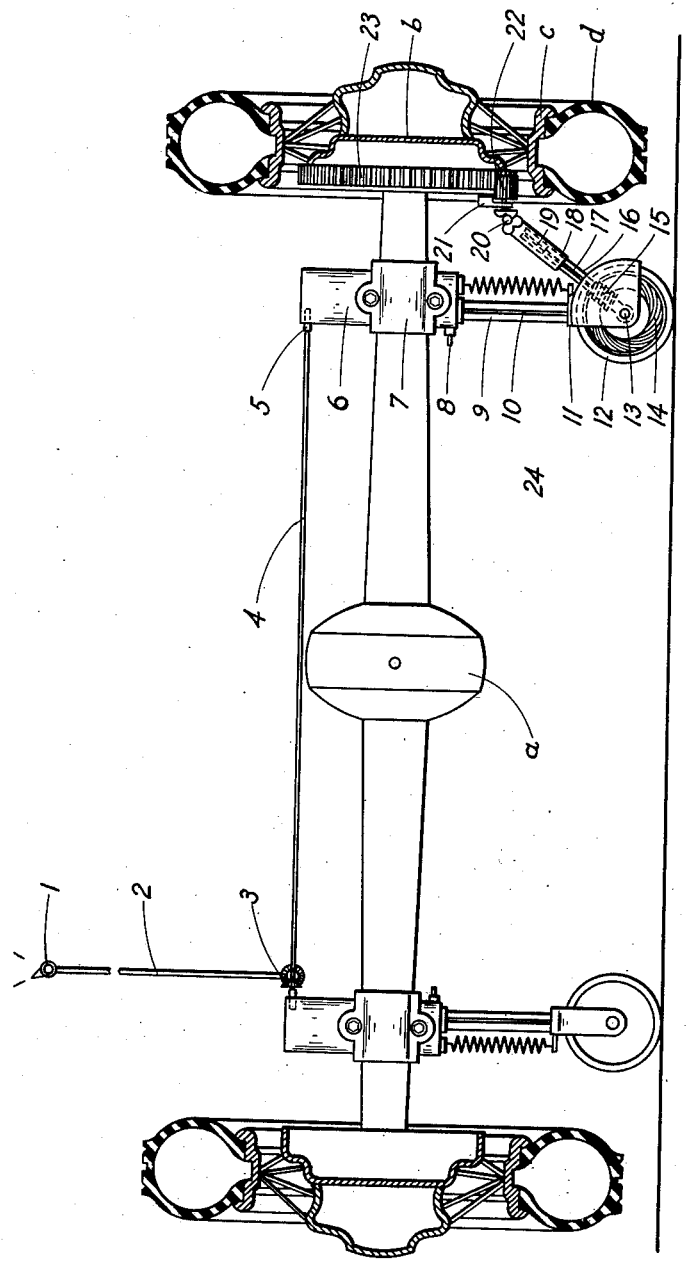
Fig. 2 is a rear elevation of a portion of a motor vehicle, partly in section and showing the apparatus applied thereto.

Referring particularly to Fig. 2, the device comprises a manually operated handle or knob 1 mounted within reach of the driver of the vehicle, said handle being pivotally connected with an extension rod 2 for actuating a gear combination 3. One of the gears 3 is secured on a second extension rod 4, which controls air-outlets 5 in communication with a fluid type jack or jacks 6 mounted by means of clamps 7 on the front or rear axle, or on both axles of the vehicle. An air valve 8 carried by the jack 6 is so constructed as to permit air to be forced into or extracted from the jack in response to the suction and exhaust of the motor of the vehicle.

A plunger 9 reciprocates within the jack housing 6 and is maintained against rotation by means of a key 10 operating in a keyway or groove in the wall of the housing 6. At the lower end of the plunger 9 is provided a guard 11 within which is disposed a roller 12 mounted for rotation on an axle 13 and carrying a worm gear 14 at one side thereof, said worm gear being in mesh with a worm 15 secured on a shaft 16. The shaft 16 is telescopically connected with a sleeve 18 at its upper end, a key 17 being carried by said shaft in engagement with a keyway 19 formed in the wall of the sleeve 18 thereby to ensure rotation of the shaft and sleeve together.

If preferred, a special motor may be provided for driving the shaft 16, but in the present instance I have shown means for driving it from the motor of the vehicle. The said means comprises a universal joint 20 one member of which is secured to the upper end of the sleeve 18, the other member of the universal joint being secured on a shaft mounted for rotation in a supporting bracket 21 and carrying a pinion 22 in mesh with a large ring gear 23 secured to one of the driving wheels of the vehicle. A spring 24 is secured at one end to the lower end of the jack housing 6 and at its opposite end to a flange at the lower end of the plunger 9 and serves normally to maintain the plunger in raised position so that its roller 12 is out of contact with the ground.

The operation of the device is as follows:

Referring especially to Fig. 2, $a$ indicates the rear end or differential of an automobile, $b$ indicates the drum of one of the driving wheels in cross-section, $c$ the rim and $d$ the tire of said wheel. This figure shows the vehicle in the raised position, the operator having actuated the handle 1 to close the outlets 5 and simultaneously open the air-valve 8, which communicates by small tubing (not shown) with the exhaust of the vehicle motor, thereby compressing the fluid within the jack housings 6 and forcing the plungers 9 downward and thus carrying the rollers 12 into contact with the ground and raising the vehicle so that its wheels are out of contact with the ground. With the vehicle thus raised, it will be readily seen that with the engine running, the operator may cause the vehicle to be moved either to the right or left by operating the usual gear shift into forward or reverse position, whereupon by actuation of the clutch in the usual manner the road wheels of the vehicle will rotate in one direction or the other and thus transmit rotary motion to the rollers 12 through the gearing 23, 22, universal joint 20, telescoping shaft 16 and worm-gearing 15, 14. When the vehicle has been moved sidewise to the desired position, the operation of the motor is discontinued, or the gears shifted into neutral position in the usual manner. The handle 1 is then operated so as to move the extension rods 2 and 4 and open the outlets 5 thereby to permit escape of the compressed air in the jacks 6 thus causing the plungers 9 to recede under the weight of the vehicle and the action of the springs 24 so that the vehicle rests on its road wheels and the rollers 12 are raised out of contact with the ground.

Fig. 3 illustrates the manner in which a vehicle II equipped with the parking apparatus described herein may be parked between two parked cars I in a space not much longer than the overall length of the car, the broken lines indicating the position of the car after the parking operation is completed.

It will thus be seen that I have provided an apparatus whereby cars may be parked without difficulty or delay in congested areas where parking spaces are extremely limited.

Having thus described my invention, what I claim is:

1. In a hydraulic parking device for automobiles, a plurality of vertical hydraulic cylinders, piston rods projecting from the lower ends of said cylinders and movable downwardly under hydraulic pressure, springs urging said piston rods upwardly, means to provide hydraulic pressure for the cylinders, wheels extending transversely of the automobile and each carried by the lower end of one of said rods, and means to drive certain of said wheels from the road wheels of the automobile, each of said means comprising a gear fixed to one of the automobile wheels, a gear fixed to one of the first mentioned wheels, a pinion driven by the first mentioned gear, a gear meshing with the second mentioned gear, and a shaft connecting the last mentioned gear with the gear driven by the first mentioned gear.

2. In a hydraulic parking device for automobiles, a plurality of vertical hydraulic cylinders, piston rods projecting from the lower ends of said cylinders and movable downwardly under hydraulic pressure, springs urging said piston rods upwardly, means to provide hydraulic pressure for the cylinders, wheels extending transversely of the automobile and each carried by the lower end of one of said rods, and means to drive certain of said wheels from the road wheels of the automobile, each of said means comprising a gear fixed to one of the automobile wheels, a gear fixed to one of the first mentioned wheels, a pinion driven by the first mentioned gear, a gear meshing with the second mentioned gear, and a shaft connecting the last mentioned gear with the gear driven by the first mentioned gear, said shaft consisting of a pair of telescopically connected sections, one of which is universally jointed to the gear driven by the first mentioned gear.

NICHOLAS V. MARDOVIN.